United States Patent [19]
Zdanowski et al.

[11] 3,900,438
[45] Aug. 19, 1975

[54] COPOLYMER-WAX COMPOSITION

[75] Inventors: Richard E. Zdanowski, Fort Washington; Bjorn E. Larsson, Rushland, both of Pa.

[73] Assignee: Rohm and Haas Company, Philadelphia, Pa.

[22] Filed: Feb. 12, 1970

[21] Appl. No.: 11,017

Related U.S. Application Data

[63] Continuation-in-part of Ser. No. 353,585, March 20, 1964, abandoned, which is a continuation-in-part of Ser. No. 74,230, Dec. 7, 1960, abandoned.

[52] U.S. Cl............ 260/28.5 R; 260/28.5 AV; 260/29.6 TA; 260/29.6 H; 260/80.73; 260/86.1 N
[51] Int. Cl...... C08f 45/24; C08f 45/52; C09g 1/10
[58] Field of Search.. 260/28.5 R, 28.5 AV, 29.6 R, 260/80.73; 260/86.1; 260/29.6 AN, 29.6 RB, 260/80.73, 86.1, 29.6 TA, 29.6 H, 86.1 N

[56] References Cited
UNITED STATES PATENTS
| | | | |
|---|---|---|---|
| 3,219,611 | 11/1965 | Witwer | 260/28.5 AV |
| 3,253,941 | 5/1966 | Finn et al. | 260/28.5 AV |

*Primary Examiner*—Allan Lieberman

[57] ABSTRACT

The invention provides coating compositions, particularly useful as floor polishes, which includes polymers containing amine monomers. The coatings are resistant to removal by alkaline detergents and soaps but are readily removed with dilute aqueous acidic solutions such as those containing 0.5% to 5% by weight of acetic acid, boric acid, or phosphoric acid.

28 Claims, No Drawings

COPOLYMER-WAX COMPOSITION

This application is a continuation-in-part of our co-pending application Ser. No. 353,585, filed Mar. 20, 1964, now abandoned, which in turn is a continuation-in-part of our abandoned application Ser. No. 74,230, filed Dec. 7, 1960.

The present invention is concerned with coating compositions for the production of glossy, bright coatings with or without polishing on surfaces of wood, linoleum, metals, asphalt tile, concrete, and the like, especially on floors, counters, and furniture.

It is known to use emulsion polymerized acid copolymers in conjunction with wax as coating compositions for various purposes and particularly for the polishing of floors. For this purpose, a small amount of acid is introduced in the copolymer for the purpose of facilitating subsequent removal of the composition when it is desired to replace the polish with a fresh, clean coating thereof. With this type of composition, care is required in the cleaning of the polished surfaces and the cleaning cannot be done with soaps or other alkaline detergents without serious risk of causing excessive damage or removal of the coating. It is an object of the present invention to provide compositions of the type that are adapted to be used for polishing floors as well as other purposes, but are adapted to be cleaned with alkaline detergents or soaps without any appreciable risk of damage or removal. Another object of the invention is to provide copolymer wax compositions which are adapted to be readily removed by the application of dilute aqueous acid solutions even those so mildly acid that they can be handled safely without harm to the hands of the user or to the surface being cleaned. Other objects and advantages will be apparent from the description of the present invention hereinafter.

In accordance with the present invention, there is provided an aqueous dispersion of an emulsifying and/or dispersing agent, a wax having a melting point of at least 75° C., and preferably at least 82° C., and a linear water-insoluble copolymer containing from 4 to 35 percent, preferably 4 to 25 percent, by weight of units having an amine group therein. The relative proportions of the copolymer to wax is from 95:5 to 50:50 by weight and preferably is about 95:5 to 70:30. The variation in these relative proportions provides for various buffing characteristics. The amount of emulsifying or dispersing agent or agents is generally from 0.1 to 15 percent, preferably 3 to 10 percent, and in some cases optimally 3 to 8 percent, of the combined weights of the copolymer and wax. The concentration of the aqueous dispersion may be from 8 to 25 percent solids and is preferably about 10 to 20 percent by weight of solids. The dispersion should have a pH of at least about 7.5 and it may be as high as 9.5 or more. In no event is it allowed to be lower than 7.0. Suitable alkaline or buffering agents, such as borax, sodium hydroxide, ammonia, or amines, may be introduced to adjust the pH to the desired value.

The various components used in making the composition are selected so that the coating obtained therefrom has a Knoop hardness number of 0.5 to 15 and preferably between about 1.2 and 12. This range of hardness provides good resistance to abrasion and wear and can be obtained by the appropriate selection of co-monomers to be copolymerized with the amine-containing monomer or monomers or by choice of wax, emulsifier, and/or alkali-soluble resin (when used) and/or by appropriate selection of the relative proportions between the various components making up the composition.

In general, the wax and copolymer should not be solubilized in one another to form a homogeneous solution but should remain as a physical heterogeneous blend of the two components. Such a heterogeneous mixture provides improved properties including better buffability and better gloss than are obtainable from compositions of such homogeneous character as those produced in which the wax and copolymer are dissolved within one another in the form of a solid solution.

Any monomer containing an amine group may be employed in making the copolymers to be used in the compositions of the present invention since the primary function of the amine component of the copolymer is to provide removability upon application of acid to coatings formed of the compositions. Any detrimental effect of the other part of the monomer containing the amine group can readily be overcome by suitable choice of comonomers. Thus if the amine monomer tends to impart softness to the copolymers containing it, this is readily counteracted by including a hardening monomer, such as styrene, vinyl acetate, acrylonitrile, or methyl methacrylate, or a mixture thereof as the comonomeric component or as part thereof. Examples of amine-containing monomers include those of any of the formulas I and II following:

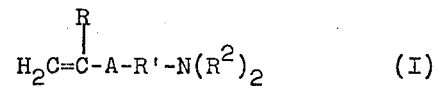

where R is selected from the group consisting of H, Cl, and CH₃,

R² is selected from the group consisting of H and saturated aliphatic hydrocarbon groups having from 1 to 10 carbon atoms, A is selected from the group consisting of —O—, S,

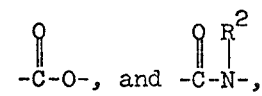

and

R' is a straight or branched chain alkylene group having from 2 to 10 carbon atoms. Members R² may be identical or different groups in its several occurrences in any particular compound. A preferred group is that of amines having the formula:

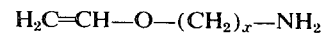

where x may be 2 to 10 but is preferably 2 to 5, the efficiency generally being a maximum when x is 2.

Examples of monomers of formula I are:
N-(3-dimethylamino)propyl methacrylate; t-butylaminoethyl methacrylate; dimethylaminoethyl methacrylate; N-(β-dimethylaminoethyl)-acrylamide; N-(β-dimethylaminoethyl)-methacrylamide; 10-aminodecyl vinyl ether; 10-aminodecyl vinyl sulfide; 8-aminooctyl vinyl ether; 6-(diethylamino)hexyl methacrylate; diethylaminoethyl vinyl ether; diethylaminoethyl vinyl sulfide; 5-aminopentyl vinyl ether; 3-aminopropyl vinyl ether; 2-aminoethyl vinyl ether; 2- aminoethyl vinyl sulfide; 2-aminobutyl vinyl ether; 4-aminobutyl vinyl ether; diethylaminoethyl methacrylate; dimethylaminoethyl vinyl ether; dimethylaminoethyl vinyl sulfide; N-(3,5,5-trimethylhexyl)aminoethyl vinyl ether; N-cyclohexylaminoethyl vinyl ether; β-(t-butylamino)ethyl acrylate; 2-(1,1,3,3-tetramethylbutylamino)ethyl methacrylate; N-t-butylaminoethyl vinyl ether; N-methylaminoethyl vinyl ether; N-2-ethylhexylaminoethyl vinyl ether; N-t-octylaminoethyl vinyl ether.

Additional amines include:

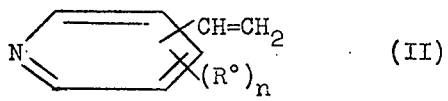

where R° is H or alkyl of 1 to 12 carbon atoms and $n$ is an integer having a value of 1 to 4. Examples include 2-vinylpyridine; 3-vinylpyridine; 4-vinylpyridine; 2-methyl-5-vinylpyridine; 5-methyl-2-vinylpyridine; 4-methyl-2-vinylpyridine; 2-ethyl-5-vinylpyridine; 2,3,-4-trimethyl-5-vinylpyridine; 3,4,5,6-tetramethyl-2-vinylpyridine; 3-ethyl-5-vinylpyridine; 2,6-diethyl-4-vinylpyridine; 2-isopropyl-4-nonyl-5-vinylpyridine; 2-methyl-5-undecyl-3-vinylpyridine; 3-dodecyl-4-vinylpyridine; 2,4-dimethyl-5,6-dipentyl-3-vinylpyridine; 2-decyl-5-(α-methylvinyl)-pyridine.

The amine-containing monomers make up at least 4 percent by weight and up to 35 percent by weight of the copolymer weight, and the balance of the copolymer may be formed of units derived from any copolymerizable monoethylenically unsaturated molecules having a group of the formula $H_2C=C<$, such as one or more of the following monomers: styrene, vinyltoluene, vinyl chloride, vinylidene chloride, vinyl acetate, acrylonitrile, methacrylonitrile, acrylamide, methacrylamide, and esters of acrylic acid or methacrylic acid with a monohydric aliphatic alcohol having from 1 to 18 carbon atoms (these esters may be defined as those of an acid of the formula

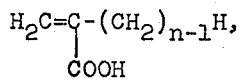

wherein $n$ is an integer having a value of 1 to 2, with an aliphatic monohydric alcohol having 1 to 18 carbon atoms) such as methyl methacrylate, methyl acrylate, ethyl acrylate, butyl methacrylate, butyl acrylate, 2-ethylhexyl acrylate, dodecyl acrylate, and octadecyl acrylate. While it is generally preferred to use polymers which are free of acid units (e.g., carboxylic, sulfonic, or phosphonic) either in free acid or salt form, nevertheless small percentages of such groups are permissible, the maximum amount varying, such as up to about 2 percent or more, of acrylic acid, methacrylic acid, itaconic acid or maleic acid units with the other components of the polymer or composition comprising it, but being sufficient to render the finish of the surfaces polished with the polymer compositions susceptible to damage or removal by such alkaline detergents as are normally used in the particular circumstances of polish application.

Generally, the preferred selections of comonomers include a substantial proportion such as from about 15 to 50 percent by weight of a comonomer that when polymerized alone produces a hard polymer such as vinyl acetate, styrene, vinyltoluene, vinyl chloride, vinylidene chloride, acrylonitrile, methacrylonitrile, acrylamide, methacrylamide, t-butyl methacrylate, isobornyl methacrylate, ethyl methacrylate or methyl methacrylate, with one or more other comonomers which when homopolymerized form soft polymers such as any of the esters of acrylic acid or an alkyl ester of methacrylic acid which has at least 4 or 5 carbon atoms in the alkyl group. Preferred examples of the soft monomers include methyl acrylate, ethyl acrylate, butyl acrylate, 2-ethylhexyl acrylate, and so on.

It is essential that the polymer containing amine groups be water-insoluble. Those amine-containing monomers which are extremely hydrophilic must be employed in relatively low proportions or they must be copolymerized with sufficient of a hydrophobizing monomer to render the resulting copolymer insoluble in water.

The coating composition may contain a blend of vinyl addition polymers which are compatible with each other including (1) a linear, water-insoluble polyer of monoethylenically unsaturated molecules comprising 4 to 100 percent by weight of units containing amine groups and (2) a linear, water-insoluble polymer of monoethylenically unsaturated molecules containing a lesser proportion of amine-containing units than the first-mentioned polymer or even containing no such units. The polymers in the blend should be so chosen as to provide at least 4 percent of amine-containing units, but not over about 35 percent by weight in the total weight of the of the polymer blend. As stated previously, the polymers in the blend should contain little or no acid groups either in free acid or salt form.

The copolymer is preferably made by the emulsion copolymerization of the several monomers in the proper proportions. Thus the monomers may be emulsified with an anionic or nonionic dispersing agent, about 1 percent to 6 percent thereof being used on the weight of total monomers. When the amine monomer is soluble in water, the dispersing agent serves to emulsify the other two monomers. A polymerization initiator of the free radical type, such as ammonium or potassium persulfate, may be used alone or in conjunction with an accelerator, such as potassium metabisulfite or sodium thiosulfate. The initiator and accelerator, commonly referred to as catalysts, may be used in proportions of ½ to 2 percent each based on the weight of monomers to be copolymerized. The temperature may be from room temperature, to 60° C. or more as is conventional. Suitable anionic dispersing agents include the sodium salts of the higher fatty acid sulfates, such as that of lauryl alcohol, the higher fatty acid salts such as the oleates or stearates of morpholine, triethanolamine or mixed ethanolamines, or any of the non-ionic types, such as ethylene oxide modified alkyl phenols, of which tert-octyl phenol modified by 20 to 40 ethylene oxide units is representative, ethylene oxide modified higher fatty alcohols, such as lauryl alcohol, containing 20 to 50 ethylene oxide units, similarly modified long-chain mercaptans, fatty acids, amines, or the like. The copolymer produced by emulsion copolymerization after proper dilution is mixed with a dispersion of the wax, and optionally with another emulsion polymer dispersion.

When the wax is separately dispersed, as is done in the preferred manner of producing the composition of the invention, the dispersing agents mentioned above may similarly be used, but amine salts or soap, such as an ethanolamine oleate or stearate, are most useful. Suitable homogenizing mills may be used for assisting the dispersion.

The wax used may either be natural or synthetic and of vegetable, animal or mineral origin and should have a melting point of at least 75° C. and preferably of at least 82° C. Specific examples of such waxes (and their melting temperatures) include carnauba (82°–84° C.), montan (84° C.), palm waxes (75°–79° C.), chinese insect (75°–80° C.), ceresin (75°–79.5° C.), azocerite (75°–80° C.), polyethylene (75°–110° C.), microcrystalline waxes (88°–91° C.) and Fisher-Tropsch wax (86°–93° C.). Mixtures of waxes may be used.

Waxes of lower melting point than 75° C. cannot be used as the sole wax component but may be mixed with one or more waxes having a melting point above 75° C. in proportions such that the mixture of wax present in the compositions of the invention melt at 75° C. or higher. Examples of the lower melting waxes (and their melting temperatures) include candelilla (standard) (65°–60° C.), candelilla (refined) (70°–72° C.), lanolin wax (49°–51° C.), cocoa butter (30°–35° C.), hydrogenated cottonseed oil wax (61° C.), stearin (52.8°–55.8° C.), Japan wax (50°–55.8° C.), bayberry (39°–49° C.), myrtle (39°–43° C.), mace, palm and palm waxes (72.2°–74° C.), beeswax (62°–72.5° C.), spermaceti (45°–49° C.), Chinese (insect) (65°–74° C.), hydrogenated mutton tallow (62° C.), hydrogenated coconut oil wax (44.5° C.), hyrogenated soybean oil wax (58.5° C.), paraffin wax (43.3°–65.5° C.), ceresin (54°–74° C.), ozocerite (65°–74° C.), low melting microcrystalline waxes (63°–74° C.).

The compositions are adapted to form clear glossy coatings. However, if desired, a translucent appearance or an opaque or colored appearance may be obtained by the introduction of dulling agents, water-soluble or oil-soluble dyes, pigments or fillers in suitable proportions. Examples of suitable water-insoluble pigments which may be used include titanium dioxide, carbon black, iron blues, phthalocyanine blues and greens; metal oxides, hydroxides, sulfides, sulfates, silicates, and chromates; organic maroons, aluminium flake, bronze powders, pearl essence, and various fillers or extenders such as talc, baryta, china clay, and diatomaceous earth.

The amount of pigment may be varied widely, depending on the effect desired. The amount of pigment, by weight based on the weight of the organic film-forming material, may vary between about 2 percent for light, high-holding pigments such as carbon black and about 100 percent for heavy, low-hiding pigments such as lead chromate.

The aqueous dispersions may contain up to about 10 percent of a plasticizer whenever it is necessary in a particular application, to provide a lower temperature of film formation from the emulsion polymer dispersions. From 5 to 75 percent by weight of the plasticizer, based on the weight of copolymer, is quite practical.

Since the purpose of the plasticizer is usually to facilitate film formation, and since it is not always necessary to impart flexibility to the copolymer composition when it is inherently tough and flexible, as is often the case, a fugitive or semi-fugitive plasticizer is preferred rather than a permanent plasticizer. However, permanent plasticizers may be used without the production of films having poor wear-resistance and poor resistance to water since the proportion of plasticizer introduced is relatively small, being not over about 10 percent by weight of the copolymer solids. Certain plasticizers, such as tributoxyethyl phosphate, serve also as leveling agents.

Examples of fugitive plasticizers include the monoethyl or monomethyl ether or diethylene glycol, isophorone, benzyl alcohol, and 3-methoxybutanol-1. Examples of essentially permanent plasticizers that are suitable include benzyl butyl phthalate, dibutyl phthalate, dimethyl phthalate, triphenyl phosphate, 2-ethyl hexyl benzyl phthalate, triphenyl phosphate, 2-ethyl hexyl benzyl phthalate, dicyclohexyl phthalate, diallyl phthalate, dibenzyl phthalate, butyl cyclohexyl phthalate, mixed benzoic acid and fatty oil acid esters of pentaerythritol, poly(propylene adipate) dibenzoate, diethylene glycol dibenzoate, tetrabutylthiodisuccinate, butyl phthalyl butyl glycolate, acetyl tributyl citrate, dibenzyl sebacate, tricresyl phosphate, toluene ethyl sulfonamide, the di-2-ethylhexyl ester of hexamethylene diphthalate, di(methylcyclohexyl)phthalate, tributoxyethyl phosphate, tributyl phosphate.

Besides containing the copolymer, the wax, and a suitable dispersing or emulsifying agent and the optional pigments and fillers mentioned hereinabove, the composition of the present invention may also contain other ingredients such as wax-soluble resins or gums or alkali-soluble resins in an amount of 1 percent to 50 percent of the weight of the copolymer. Examples of the wax-soluble materials include terpene-phenolic resins, heat-processed ("run") Congo, wood rosin, oxidized petroleum wax, and so on.

Examples of alkali-soluble resins include shellac, Manila gum, Loba gum, and alkali-soluble alkyds, which are essentially polyesters of aliphatic dicarboxylic acids with aliphatic polyhydric alcohols which may be modified with ($C_8$–$C_{18}$)- fatty acids, glycerol esters of ($C_8$–$C_{18}$)- fatty acids, and resin acids, such as abietic or rosin. The resins disclosed in U.S. Pat. No. 2,063,542 may be used. These resins have acid numbers of about 100 to 145. Examples of the dicarboxylic acids include maleic, fumaric, adipic, sebacic, including anhydrides thereof. The polyhydric alcohols may be glycerol, pentaerythritol, trimethylolethane, and glycols having 2 to 8 carbon atoms including diethylene glycol and triethylene glycol. In such compositions the amount of dispersing or emulsifing agent or agents may be from 3 to 8 percent of the combined weights of copolymer and wax. The concentration of the aqueous dispersion for application purposes may desirably be from 8 to 25 percent solids and is preferably from about 10 to 15 percent by weight of solids.

The compositions may be applied to plastic sheets such as cellophane, polyethylene, polyethylene glycol terephthalate, saran, and the like. They may also be applied to rigid surfaces, including all sorts of metals such as steel, aluminum, copper, brass, bronze, tin, chromium, and wrought iron, to all types of natural and synthetic flooring materials, such as asphalt tile, vinyl tile, rubber tile, vinyl asbestos tile, cork tile, and linoleum, and to wood, stone, masonry, brick, glass, asbestos cement shingles or siding, terrazzo, cement and concrete surfaces such as floors, and so on.

In floor polishing compositions the proportions of the main ingredients should be:

| Constituent | Proportion |
| --- | --- |
| A. Copolymer | 50–95 parts by weight |
| B. Wax | 5–50 parts by weight |
| C. Alkali-soluble resin | 0–30 parts by weight |
| D. Wetting, emulsifying and dispersing agents | 0.1 to 15% of A + B + C |
| E. Water | to make total solids of 8% to 25% |

For a non-buffable, self-polishing compositions, the wax should not be over 35 parts by weight, preferably 5 to 25 parts by weight in the formulation of the above table. For a buffable composition the wax should be at least 35 parts by weight. Examples of wetting and dispersing agents include alkali metal and amine salts of higher fatty acids having 12 to 18 carbon atoms, such as sodium, potassium, ammonium, or morpholine oleate or ricinoleate, as well as the common non-ionic surface active agents. Additional wetting agent improves the spreading action of the polish.

The copolymer and wax (and resin when used) may be mixed in any order desired. For example, the wax or resin or both may be introduced into the aqueous polymer dispersion by adding a dispersion of the wax or resin or both to the copolymer dispersion or vice versa. Preferably, the copolymer dispersion is added to a dispersion of the wax and then the resin is mixed in. The wax dispersion may be prepared using any of the anionic or non-ionic dispersing agents mentioned above for use in copolymerization. However, amine salts of soap such as ethanolamine or morpholine oleate or stearate, are quite useful. The preparation of solid solutions of wax and copolymer by melting the two together is avoided in all cases.

In the preferred compositions it is generally the rule that no alkali-sensitive material such as an alkali-soluble resin is employed. However, with the amine-containing copolymer of the present invention, it has been found that even though an alkali-soluble resin is present in substantial amounts, coatings therefrom having hardness in the range of 0.5 to 15 (Knoop hardness number) can be washed with soaps and alkaline detergents without a requirement of excessive care to prevent damage by partial or complete removal of the coating. However, it is preferred that the amount of alkali-soluble resin be less than 20 percent by weight of the total of polymer and wax solids.

The compositions have good storage stability under normal conditions of temperature. They may be applied in the usual manner by means of temperature. They may be applied in the usual manner by means of wiping cloths, by brushing, or by means of mops. They dry rapidly to clear or colored films, if pigmented, having hard and tough glossy surfaces. There is substantially no discoloration of the films on ageing. They are resistant to cleaning with soapy solutions or alkaline solutions such as dilute aqueous ammonia whenever it is necessary to clean the surfaces. The coatings, however, are readily removed with dilute aqueous acid solutions such as those containing from ½ to 5 percent by weight of acetic acid, boric acid, or phosphoric acid, whenever it is necessary, either because of accumulation of dirt or because of the need to paint or varnish the base surfaces, for such removal.

The following examples in which the parts and precentages are by weight unless otherwise indicated are illustrative of the invention.

EXAMPLE 1 a. An emulsion copolymer was prepared with the following weight percent composition employing 3 percent sodium lauryl sulfate (based on total weight of the monomers) as the emulsifier and conventional emulsion polymerization technique:

| | |
| --- | --- |
| ethyl acrylate | 60% |
| methyl methacrylate | 30% |
| t-butylaminoethyl methacrylate | 10% |

The final polymer solids concentration of the emulsion was 45.1 percent. The emulsion was diluted with water to 15 percent polymer solids.

b. A mixture of 40 parts by weight of emulsifiable low molecular weight polyethylene melting at about 75° C. and 8 parts by weight of oleic acid was melted and 8 parts by weight of morpholine was added to the mixture. The complete melt was added slowly to 184 parts by weight of water heated to 205° F. while under vigorous agitation. The emulsion was allowed to cool and was then diluted to 15 percent solids.

c. Ten parts by weight of ammonia-soluble rosin-maleic type adduct partially esterified with a polyhydric alcohol sold by the Rohm and Haas Company under the trademark Amberol 750 was added to 56.5 parts by weight of water containing 1.4 parts by weight of 28 percent NH$_4$OH solution and maintained at 50° C. The resulting solution was filtered.

d. Seventy-two and a half parts of the polymer dispersion in part (a) was mixed with eleven parts by weight of wax emulsion from part (b) and 16.5 parts by weight of Amberol 750 solution from part (c). The resulting mixture was further modified by the addition of one part by weight of tributoxyethyl phosphate and one and a half parts by weight of ethylene glycol monoethyl ether. The pH of the final formulation was adjusted to 9.2 with morpholine. The amount of polyethylene wax, based on the combined weights of the wax and copolymer, is about 9.8 percent.

The coating composition was quite stable on storing. When applied to lineolum, vinyl and asphalt floor tile surfaces it levelled well and dried rapidly to give a tough surface characterized by excellent initial gloss and excellent retention of gloss after submission to foot traffic. The coating was found to show no water-spotting when exposed to water for 1 hour after a 4-hour drying at 25° C. It showed no evidence of removal or loss of gloss when scrubbed with 3 percent NH$_4$OH solution or a variety of commercial detergent-based wax strippers. The film was, however, easily removable with 3 percent solution of acetic acid, boric acid or phosphoric acid.

EXAMPLE 2

Example 1 was repeated substituting a mixture of 20 parts ethyl acrylate, 45 parts methyl methacrylate and 35 parts dimethylaminoethyl methacryalte for the monomers in part (a). Similar results were obtained as in Example 1.

EXAMPLE 3

Example 1 was repeated substituting a mixture of 25 parts ethyl acrylate, 71 parts methyl methacrylate and 4 parts dimethylaminoethyl methacrylate for the monomers in part (a). Analogous results to those in Example 1 were obtained.

EXAMPLE 4

Similar results were obtained when Example 1 was repeated substituting a mixture of 45 parts ethyl acrylate, 45 parts methyl methacrylate and 10 parts dimethylaminoethylmethacrylate for the monomers in part (a).

EXAMPLE 5 a. An emulsion copolymer was prepared with the following weight percent composition employing 3 percent sodium lauryl sulfate (based on total weight of the monomers) as the emulsifier and conventional emulsion polymerization technique:

| ethyl acrylate | 10% |
| methyl methacrylate | 90% |

The final polymer solids concentration was 38 percent. The emulsion was diluted with water to 15 percent solids.

b. An emulsion homopolymer of dimethylaminoethyl methacrylate was prepared employing 6 percent (based on total weight of the monomer) of the sodium salt of t-octylphenoxyethoxyethylsulfate as the emulsifier and conventional emulsion polymerization technique. The completed emulsion was diluted with water to 15 percent solids.

c. Ninety parts of the dispersion in part (a) was mixed with 10 parts of the dispersion in part (b). Then 45 parts of this physical blend of the two dispersions was mixed with 45 parts of the wax emulsion from part (b) in Example 1 and 10 parts of Amberol 750 solution in part (c) of Example 1. The mixture was then modified with the addition of one part by weight of tributoxyethylphosphate and one part by weight of ethyleneglycol monoethylether. When the composition was applied to linoleum, vinyl and asphalt floor tile surfaces it levelled well and dried rapidly to give a tough surface characterized by excellent initial gloss and excellent retention of gloss after submission to foot traffic. The coating was found to show no water-spotting when exposed to water for 1 hour after a 2-hour drying period at 25° C. It showed no evidence of removal or loss of gloss when scrubbed with 3 percent NH₄OH solution or a variety of commercial detergent solutions. The film was, however, easily removable with 3 percent solutions of acetic, boric or phosphoric acids.

EXAMPLE 6

Example 5 was repeated using 20 parts of ethyl acrylate and 80 parts of methyl methacrylate in part (a) and a homopolymer of t-butylaminoethylmethacrylate in part (b). The results obtained were essentially the same as those obtained in Example 5.

EXAMPLE 7

Analogous results to those in Example 1 were obtained when Example 1 was repeated employing a mixture of 20 parts of butyl acrylate, 60 parts of methyl methacrylate and 20 parts of dimethylaminoethylmethacrylate.

EXAMPLE 8

Example 1 was repeated substituting a mixture of 40 parts of ethyl acrylate, 40 parts of styrene and 20 parts of dimethylaminoethylmethacrylate, for the monomers in part (a). Results similar to those in Example 1 were obtained.

EXAMPLE 9 a. An emulsion copolymer was prepared with the following weight percent composition employing 6 percent of t-octylphenoxypolyethoxyethanol containing about 10 oxyethylene units (based on total weight of the monomer) as the emulsifier and conventional emulsion polymerization technique:

| ethyl acrylate | 50 |
| vinyltoluene | 20 |
| dimethylaminoethylmethacrylate | 30 |

The emulsion was diluted with water to 15 percent solids.

b. Seventy-two parts of the polymer dispersion of part (a) was mixed with 10 parts of the wax emulsion of Example 1(b).

c. The emulsion of part (b) was applied to linoleum, vinyl and asphalt floor tile surfaces. It was dried to give a tough glossy surface which did not water-spot when exposed to water. It also showed no evidence of removal when scrubbed with 3 percent NH₄OH solution or a vareity of commercial detergent solutions. The coating was, however, easily removable with 3 percent acetic, boric or phosphoric acid.

EXAMPLE 10 a. Part (a) of Example 9 was repeated substituting a mixture of 70 parts of ethyl acrylate, 20 parts methyl methacrylate and 10 parts dimethylaminoethylmethacrylate for the monomers in part (a). The final solids of the dispersion was adjusted to 40 percent.

b. Twenty parts by weight of carnauba wax was melted and then introduced into 120 parts by weight of water at 95° C. which also contained 4 parts by weight of oleic acid and 2.5 parts by weight of morpholine.

c. There were mixed and ground on a roller mill 266.2 parts of titanium dioxide, 76.0 parts of lithopone, 51.5 parts of mica, 80.7 parts of silica, 6.8 parts of formaldehyde-condensed sodium naphthalene sulfonate, 7.2 parts of diethylene glycol, and 189.5 parts of water. When this mixture was ground to a smooth, uniform paste, it was mixed thoroughly with 600 parts of the 40 percent aqueous dispersion from part (a) and 115 parts of the wax dispersion of part (b). The resulting product was a white flat paint which was applied to masonry or brick surfaces with excellent covering power and good flow and levelling characteristics. The amount of carnauba wax, based on the combined weights of the wax and copolymer, is about 15.6 percent.

EXAMPLE 11

Example 1 was repeated except that the monomers used in part (a) were:

| methyl acrylate | 75% |
| ethyl methacrylate | 15% |
| 5-aminopentyl vinyl ether | 10% |

EXAMPLE 12

Example 1 was repeated except that the monomers used in part (a) were:

| | |
|---|---|
| n-butyl acrylate | 50% |
| methyl methacrylate | 44% |
| N-(dimethylaminoethyl)-acrylamide | 6% |

Similar dilute acid-removable coatings were obtained.

EXAMPLE 13

Example 1 was repeated except that the monomers used in part (a) were:

| | |
|---|---|
| ethyl acrylate | 60% |
| vinyltoluene | 20% |
| β-aminoethyl vinyl sulfide | 20% |

Similar dilute acid-removable coatings were obtained.

EXAMPLE 14

Example 1 was repeated except that monomers used in part (a) were:

| | |
|---|---|
| ethyl acrylate | 60% |
| vinyl acetate | 33% |
| 4-vinylpyridine | 7% |

Similar dilute acid-removable coatings were obtained.

EXAMPLE 15

Example 10 was repeated except that the monomers used in part (a) were:

| | |
|---|---|
| vinylidene chloride | 40% |
| methyl acrylate | 45% |
| 2-methyl-5-vinylpyridine | 15% |

Similar results were obtained.

EXAMPLE 16

The procedure of Example 5 was repeated substituting an emulsion homopolymer of N-t-octylamino ethyl vinyl ether for the homopolymer of dimethylaminoethyl methacrylate. Similar results were obtained.

EXAMPLE 17

The procedure of Example 5 was repeated substituting an emulsion homopolymer of diethylaminoethyl acrylate for the homopolymer of dimethylaminoethyl methacrylate. Similar results were obtained.

EXAMPLE 18

Example 1 was repeated except that the low molecular weight polyethylene wax was replaced by the same amount of polyethylene wax melting at about 105° C.

EXAMPLE 19

Example 10 was repeated except that the carnauba wax was replaced with 20 parts by weight of montan wax.

EXAMPLE 20

Example 1 was repeated except that the low molecular weight polyethylene was replaced by the same amount by weight of a mixture of microcrystalline waxes melting at about 82° C.

EXAMPLE 21

Example 1 was repeated except that the low molecular weight polyethylene was replaced by the same amount by weight of a Fischer-Tropsch wax melting at about 90° C.

EXAMPLE 22

Example 1 was repeated except that the low molecular weight polyethylene was replaced by a mixture of 20 parts by weight of emulsifiable low molecular weight polyethylene melting at about 75° C. and 20 parts by weight of a microcrystalline wax melting at about 85° C.

EXAMPLE 23

The procedure of Example 10 was repeated except that the carnauba wax was replaced by a mixture of 10 parts of Chinese insect wax melting at about 72° C. and about 10 parts by weight of Chinese insect wax melting at 80° C.

We claim:

1. In a coating composition adapted to be used for polishing floors, furnitrue and the like formed of an aqueous dispersion, having a pH of at least 7.0, capable of forming a coating film having a Knoop hardness number of at least 0.5, containing, as essential components, water, a dispersing agent, a water-in-soluble linear polymeric material, and a wax, wherein the polymeric material and the wax are present in the dispersion as a physical heterogeneous blend rather than as a homogeneous solid solution of one within another, the improvement characterized in that:

A. There is used, as the linear polymeric material, a material selected from the group consisting of (I) copolymers of about 4 to 35 percent by weight of at least one monomer containing an amine group and a group of the formula $H_2C=C<$ with at least one other monoethylenically unsaturated monomer having a group of the formula $H_2C=C$, any content of monomer containing a group selected from the group consisting of acid groups and salts thereof not being in excess of about 2 percent by weight in the copolymer, and (II) a blend of (I) a linear, water-insoluble polymer of monoethylenically unsaturated molecules comprising 4 to 100 percent by weight of units containing amine groups and (2) a linear, water-insoluble polymer of monethylenically unsaturated molecules, any content of amine-containing units in the polymer (2) being lesser than that in the polymer (1), there being at least 4 percent but not over 35 percent by weight of amine-containing units in the total weight of the polymer blend, any content, in the polymer blend, of monomer containing a group selected from the group consisting of acid groups and salts thereof not being in excess of 2 percent by weight of the blend, B. For the wax, there is used a wax melting at a temperature of at least 75° C., and C. The ratio of polymeric material to wax is from 95:5 to 50:50.

2. A composition as defined in claim 1 in which the ratio of polymeric material to wax is from 95:5 to 70:30 and the solids concentration is 8 to 25 percent by weight.

3. A composition as defined in claim 1 in which the composition also comprises a member selected from the group consisting of wax-soluble resins and gums and alkali-soluble resins.

4. A composition as defined in claim 1 in which the wax melts at a temperature of at least 82° C.

5. A composition as deinfed in claim 1 in which the amine-containing monomer from which the polymeric material is formed comprises at least one monomer selected from the group consisting of those having one of the formulas I and II following:

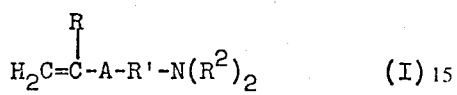

where
R is selected from the group consisting of H, Cl, and $CH_3$,
$R^2$ is selected from the group consisting of H and saturated aliphatic hydrocarbon groups having from 1 to 10 carbon atoms,
A is selected from the group consisting of —O—, —S—,

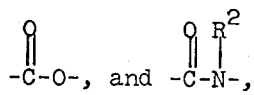

and
R' is an alkylene group having 2 to 10 carbon atoms,

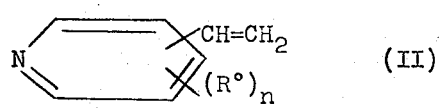

where R° is selected from the group consisting of H and alkyl groups having 1 to 12 carbon atoms and n is an integer having a value of 1 to 4.

6. In a coating composition adapted to be used for polishing floors, furniture and the like formed of an aqueous dispersion, having a pH of at least 7.0, capable of forming a coating film having a Knoop hardness number of at least 0.5, containing, as essential components, water, a dispersing agent, a water-in-soluble linear polymeric material, and a wax, wherein the polymeric material and the wax are present in the dispersion as a physical heterogeneous blend rather than as a homogeneous solid solution of one within another, the improvement characterized in that:

A. There is used, as the linear polymeric material, a copolymer of about 4 to 35 percent by weight of at least one monomer containing an amine group and a group of the formula $H_2C{=}C{<}$ with at least one other monoethylenically unsaturated monomer having a group of the formula $H_2C{=}C{<}$, any content of monomer containing a group selected from the group consisting of acid groups and salts thereof not being in excess of about 2 percent by weight in the copolymer, B. For the wax, there is used a wax melting at a temperature of at least 75° C., and C. The ratio of copolymer to wax is from 95:5 to 50:50.

7. A composition as defined in claim 6 in which the ratio of copolymer to wax is from 95:5 to 70:30 and the solids concentration is 8 to 25 percent by weight.

8. A composition as defined in claim 6 in which the composition also comprises a member selected from the group consisting of wax-soluble resins and gums and alkali-soluble resins.

9. A composition as defined in claim 6 in which the amine is copolymerized with at least one member selected from the group consisting of styrene, vinyltoluene, vinyl acetate, vinyl chloride, vinylidene chloride, acrylonitrile, methacrylonitrile, acrylamide, methacrylamide, and esters of acrylic acid and of methacrylic acid with an alcohol having 1 to 18 carbon atoms.

10. A coating composition as defined in claim 6 in which the copolymer is a copolymer of monoethylenically unsaturated molecules comprising 4 to 25 percent by weight of at least one of the aforesaid monomers containing an amine group and the composition is adapted to form a coating film having a Knoop hardness number of about 1.2 to 12.

11. A composition as defined in claim 9 in which the amine-containing monomer from which the polymeric material is formed comprises at least one monomer selected from the group consisting of those having one of the formulas I and II following:

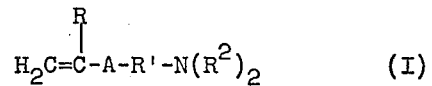

where
R is selected from the group consisting of H, Cl, and $CH_3$,
$R^2$ is selected from the group consisting of H and saturated aliphatic hydrocarbon groups having from 1 to 10 carbon atoms,
A is selected from the group consisting of —O—, —S—,

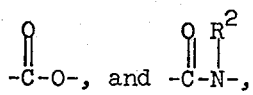

and
R' is an alkylene group having 2 to 10 carbon atoms,

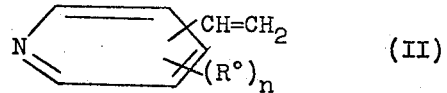

where R° is selected from the group consisting of H and alkyl groups having 1 to 12 carbon atoms and n is an integer having a value of 1 to 4.

12. In a coating composition adapted to be used for polishing floors, furniture and the like formed of an aqueous dispersion, having a pH of at least 7.0, capable of forming a coating film having a Knoop hardness number of at least 0.5, containing as essential components, water, a dispersing agent, a water-in-soluble linear polymeric material, and a wax, wherein the polymeric material and the wax are present in the dispersion as a physical heterogeneous blend rather than as a homogeneous solid solution of one within another, the improvement characterized in that:

A. There is used, as the linear polymeric material, a water-insoluble linear copolymer of 4 to 25 percent by weight of t-butylaminoethyl methacrylate with at least one other monoethylenically unsaturated monomer, any content of monomer containing a group selected from the group consisting of acid groups and salts thereof not being in excess of about 2 percent by weight in the copolymer, B. For the wax, there is used a wax melting at a temperature of at least 75° C., and C. The ratio of copolymer to wax is from 95:5 to 50:50.

13. In a coating composition adapted to be used for polishing floors, furniture and the like formed of an aqueous dispersion, having a pH of at least 7.0, capable of forming a coating film having a Knoop hardness number of at least 0.5, containing as essential components, water, a dispersing agent, a water-in-soluble linear polymeric material, and a wax, wherein the polymeric material and the wax are present in the dispersion as a physical heterogeneous blend rather than as a homogeneous solid solution of one within another, the improvement characterized in that:

A. There is used, as the linear polymeric material, a water-insoluble linear copolymer of 4 to 25 percent by weight of dimethylaminoethyl methacrylate with at least one other monoethylenically unsaturated monomer, any content of monomer containing a group selected from the group consisting of acid groups and salts thereof not being in excess of about 2 percent by weight in the copolymer, B. For the wax, there is used a wax melting at a temperature of at least 75° C., and C. The ratio of copolymer to wax is from 95:5 to 50:50.

14. In a coating composition adapted to be used for polishing floors, furniture and the like formed of an aqueous dispersion, having a pH of at least 7.0, capable of forming a coating film having a Knoop hardness number of at least 0.5, containing as essential components, water, a dispersing agent, a water-in-soluble linear polymeric material, and a wax, wherein the polymeric material and the wax are present in the dispersion as a physical heterogeneous blend rather than as a homogeneous solid solution of one within another, the improvement characterized in that:

A. There is used, as the linear polymeric material, a water-insoluble linear copolymer of 4 to 25 percent by weight of N-(dimethylaminoethyl)-acrylamide with at least one other monoethylenically unsaturated monomer, any content of monomer containing a group selected from the group consisting of acid groups and salts thereof not being in excess of about 2 percent by weight in the copolymer, B. For the wax, there is used a wax melting at a temperature of at least 75° C., and C. The ratio of copolymer to wax is from 95:5 to 50:50.

15. In a coating composition adapted to be used for polishing floors, furniture and the like formed of an aqueous dispersion, having a pH of at least 7.0, capable of forming a coating film having a Knoop hardness number of at least 0.5, containing as essential components, water, a dispersing agent, a water-in-soluble linear polymeric material, and a wax, wherein the polymeric material and the wax are present in the dispersion as a physical heterogeneous blend rather than as a homogeneous solid solution of one within another, the improvement characterized in that:

A. There is used, as the linear polymeric material, a water-insoluble linear copolymer of 4 to 25 percent by weight of 4-vinyl pyridine with at least one other monoethylenically unsaturated monomer, any content of monomer containing a group selected from the group consisting of acid groups and salts thereof not being in excess of about 2 percent by weight in the copolymer, B. For the wax, there is used a wax melting at a temperature of at least 75° C., and C. The ratio of copolymer to wax is from 95:5 to 50:50.

16. In a coating composition adapted to be used for polishing floors, furniture and the like formed of an aqueous dispersion, having a pH of at least 7.0, capable of forming a coating film having a Knoop hardness number of at least 0.5, containing, as essential components, water, a dispersing agent, a water-in-soluble linear polymeric material, and a wax, wherein the polymeric material and the wax are present in the dispersion as a physical heterogeneous blend rather than as a homogeneous solid solution of one within another, the improvement characterized in that:

A. There is used, as the linear polymeric material, a water-insoluble linear copolymer of ethyl acrylate, methyl methacrylate, and 4 to 25 percent of t-butylaminoethyl methacrylate, B. For the wax, there is used a wax melting at a temperature of at least 75° C., and C. The ratio of copolymer to wax is from 95:5 to 50:50.

17. In a coating composition adapted to be used for polishing floors, furniture and the like formed of an aqueous dispersion, having a pH of at least 7.0, capable of forming a coating film having a Knoop hardness number of at least 0.5, containing as essential components, water, a dispersing agent, a water-in-soluble linear polymeric material, and a wax, wherein the polymeric material and the wax are present in the dispersion as a physical heterogeneous blend rather than as a homogeneous solid solution of one within another, the improvement characterized in that:

A. There is used, as the linear polymeric material, a water-insoluble linear copolymer of ethyl acrylate, methyl methacrylate, and 4 to 25 percent by weight of dimethylaminoethyl methacrylate, B. For the wax, there is used a wax melting at a temperature of at least 75° C., and C. The ratio of copolymer to wax is from 95:5 to 50:50.

18. In a coating composition adapted to be used for polishing floors, furniture and the like formed of an aqueous dispersion, having a pH of at least 7.0, capable of forming a coating film having a Knoop hardness number of at least 0.5, containing, as essential components, water, a dispersing agent, a water-in-soluble linear polymeric material, and a wax, wherein the polymeric material and the wax are present in the dispersion as a physical heterogeneous blend rather than as a homogeneous solid solution of one within another, the improvement characterized in that:

A. There is used, as the linear polymeric material, a water-insoluble linear copolymer of monoethylenically unsaturated molecules comprising 4 to 25 percent by weight of at least one ester of the formula

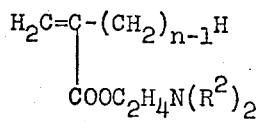

wherein

*n* is an integer having a value of 1 to 2, and
$R^2$ is a saturated aliphatic hydrocarbon group having 1 to 10 carbon atoms, and at least one ester of an acid of the formula

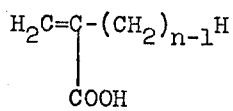

wherein *n* is an integer having a value of 1 to 2, with an aliphatic monohydric alcohol having 1 to 18 carbon atoms, any content of monomer containing a group selected from the group consisting of acid groups and salts thereof not being in excess of about 2 percent by weight in the copolymer, B. For the wax, there is used a wax melting at a temperature of at least 75° C., and
C. The ratio of copolymer to wax is from 95:5 to 50:50.

19. In a coating composition adapted to be used for polishing floors, furniture and the like formed of an aqueous dispersion, having a pH of at least 7.0, capable of forming a coating film having a Knoop hardness number of at least 0.5, containing as essential components water, a dispersing agent, a water-in-soluble linear polymeric material, and a wax, wherein the polymeric material and the wax is present in the dispersion as a physical heterogeneous blend rather than as a homogeneous solid solution of one within another, the improvement characterized in that:

A. There is used, as the linear polymeric material, a blend of a homopolymer of dimethylaminoethyl methacrylate and a polymer of at least one ester of an acid of the formula

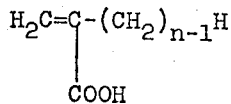

wherein *n* is an integer having a value of 1 to 2, with an aliphatic monohydric alcohol having 1 to 18 carbon atoms, any content of monomer containing a group selected from the group consisting of acid groups and salts thereof not being in excess of about 2 percent by weight in the polymer, the amount of homopolymer and polymer in the polymer blend being such as to provide between 4 and 35 percent by weight, based on the total polymer blend weight, of polymerized amine-containing monomer units, B. For the wax, there is used a wax melting at a temperature of at least 75° C., and
C. The ratio of copolymer to wax is from 95:5 to 50:50.

20. In a coating composition adapted to be used for polishing floors, furniture and the like formed of an aqueous dispersion, having a pH of at least 7.0, capable of forming a coating film having a Knoop hardness number of at least 0.5, containing as essential components, water, a dispersing agent, a water-insoluble linear polymeric material, and a wax, wherein the polymeric material and the wax are present in the dispersion as a physical heterogeneous blend rather than as a homogeneous solid solution of one within another, the improvement characterized in that:

A. There is used, as the linear polymeric material, a blend of a homopolymer of t-butylaminoethyl methacrylate and a polymer of at least one ester of an acid of the formula

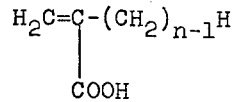

wherein *n* is an integer having a value of 1 to 2, with an aliphatic monohydric alcohol having 1 to 18 carbon atoms, any content of monomer containing a group selected from the group consisting of acid groups and salts thereof not being in excess of about 2 percent by weight in the polymer, the amount of homopolymer and polymer in the polymer blend being such as to provide between 4 and 35 percent by weight, based on the total polymer blend weight, of polymerized amine-containing monomer units, B. For the wax, there is used a wax melting at a temperature of at least 75° C., and
C. The ratio of copolymer to wax is from 95:5 to 50:50.

21. An aqueous polish composition adapted to be used for polishing floors, furniture and the like consisting essentially of:
1. water,
2. a dispersing agent, and
3. film forming components, said film forming components containing in the minor amount a high melting point wax, and in the major amount a water-insoluble linear copolymer of at least one monomer containing an amine group and a monoethylenically unsaturated group with at leasat one other copolymerizable ethylenically unsaturated monomer, wherein the monomer containing the amine group is present in an amount sufficient to render a dried coating of the composition on a substrate capable of being removed from the substrate by an acid solution.

22. The composition of claim 21 in which the wax is polyethylene wax or carnauba wax present in the amount of 5 to 50 parts by weight for each 50 to 95 parts of copolymer.

* * * * *

UNITED STATES PATENT OFFICE
CERTIFICATE OF CORRECTION

PATENT NO. : 3,900,438
DATED : August 19, 1975
INVENTOR(S) : Richard E. Zdanowski, Bjorn E. Larsson It is certified that error appears in the above-identified patent and that said Letters Patent are hereby corrected as shown below:

Column 3, line 61 - "sufficient" should be --insufficient--.

Column 4, line 38 after "or" insert "a".

Column 5, line 12, "azocerite" should be --ozocerite--.

Column 5, line 23 "(65°-60° C.)" should be --(65°-69° C.)--.

Column 5, line 52 "high-holding" should be --high-hiding--.

Column 8, line 1 "precentage" should be --percentage--.

Column 8, line 63 "methacryalte" should be --methacrylate--.

Column 10, line 31 "vareity" should be --variety--.

Column 12, line 26 "furnitrue" should be --furniture--.

Column 18, line 60, "the" should be --an--.

Signed and Sealed this sixteenth Day of December 1975

[SEAL]

Attest:

RUTH C. MASON
Attesting Officer

C. MARSHALL DANN
Commissioner of Patents and Trademarks